United States Patent
Liu et al.

[11] Patent Number: 5,854,892
[45] Date of Patent: Dec. 29, 1998

[54] VIDEO CONFERENCING DECODER ENGINE WITH DIRECT SIGNALING TO ENCODER ENGINE FOR RELAYING OF DECODED DATA

[75] Inventors: Christina K. Liu, Oakland, Calif.; Yung D. Nguyen, Portland; Judith A. Goldstein, Hillsboro, both of Oreg.

[73] Assignee: Intel Corporation, Santa Clara, Calif.

[21] Appl. No.: 642,328

[22] Filed: May 3, 1996

[51] Int. Cl.$^6$ ........................................................ H04M 3/56
[52] U.S. Cl. .................................. 395/200.34; 395/200.8; 370/270; 348/15
[58] Field of Search ........................... 395/200.34, 200.35, 395/200.57, 892, 200.68, 200.8; 345/526, 502, 522; 348/15, 16, 17, 18, 19, 384, 552, 720, 721; 370/261, 263, 266, 270

[56] References Cited

U.S. PATENT DOCUMENTS 5,200,951  4/1993  Grau et al. ............................... 370/261

*Primary Examiner*—Dung C. Dinh
*Attorney, Agent, or Firm*—N. Stephan Kinsella, Esq.; William H. Murray, Esq.

[57] ABSTRACT

There is provided herein a method, apparatus, and storage medium for processing data. According to one embodiment, encoded data is received by a playback engine of a computer system. A decoder of the playback engine decodes the encoded data. A capture engine of the computer system is notified to encode the decoded data. The decoded data is encoded with an encoder of the capture engine.

12 Claims, 4 Drawing Sheets

FIG. 1. ENCODING SYSTEM

FIG. 2. DECODING SYSTEM

400

5,854,892

VIDEO CONFERENCING DECODER ENGINE WITH DIRECT SIGNALING TO ENCODER ENGINE FOR RELAYING OF DECODED DATA

BACKGROUND OF THE INVENTION

1. Field of the Invention

The present invention relates to the processing of data, and, in particular, to retransmission of video data through a computer system.

2. Description of the Related Art

This invention relates to data signal communication and to signal processing which is often used to encode data signals into an encoded bitstream and to decode such encoded bitstream to reconstruct the original data signals. Such encoded data signals are often video image signals representative of video pictures. Video pictures may be still images or may be part of a plurality of successive pictures of video signal data that represent a motion video.

Computer systems, such as personal computer (PC)-based systems, are often interconnected as elements of a network for communication of data. In a data conferencing system, for example, various PC-based nodes or endpoints of the data conference typically receive encoded data from other endpoints on the network. The encoding may involve compression of the data, for example video frames or pictures, to reduce the communications bandwidth required to transmit data between endpoints of the conference. Different encoding formats are used in data encoding and decoding. For example, one video standard used to represent images in computer-based image processing systems is the H.261 video standard (International Telecommunication Union (ITU), Recommendation H.261 (March 1993), "Video codec for audiovisual services at p×64 kbits").

In such data conferencing systems, each endpoint may comprise encoding and decoding software and/or hardware to encode data transmitted over the network and the decode encoded data received over the communications network. It is often desirable for such data conferencing endpoints or other computer systems to be able to capture, encode, and transmit local data to remote endpoints on the network; and to be able to receive, decode, and display or otherwise process or utilize encoded data received from remote endpoints. It may also be desirable for such a system to be able to receive encoded data from an endpoint and retransmit this encoded data to other endpoints. This retransmission may be difficult or expensive, in terms of processing and communications bandwidth required, to achieve, for certain software/hardware architectures.

There is, therefore, a need for methods and apparatuses that overcome the limitations of the known art and provide for improved retransmission of data signals.

SUMMARY

There is provided herein a method, apparatus, and storage medium for processing data. According to one embodiment of the invention, encoded data is received by a playback engine of a computer system. A decoder of the playback engine decodes the encoded data. A capture engine of the computer system is notified to encode the decoded data. The decoded data is encoded with an encoder of the capture engine.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

The present invention provides for a PC system video subsystem architecture having a capture engine and a playback engine. These engines are configured so that encoded data received by the playback engine may be use as input to the capture engine, thus allowing the system to efficiently retransmit or otherwise process the data.

Systems for Encoding of Captured Video Signals and Decoding of Encoded Video Signals This section describes an exemplary encoding system to illustrate the encoding of captured video signals to produce encoded video signals, and an exemplary decoding system to illustrate the decoding of encoded video signals.

Figure 1:
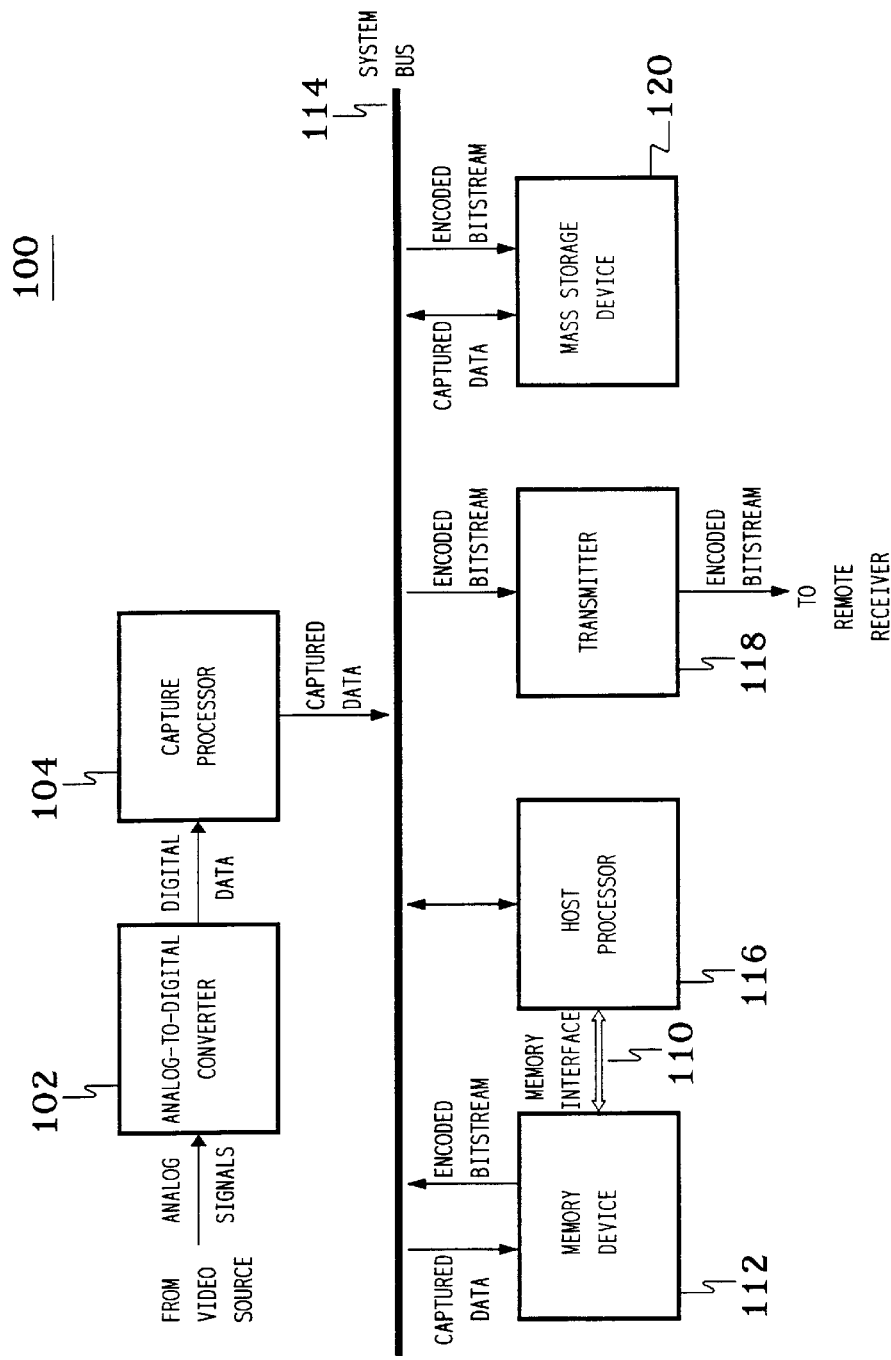
FIG. 1 is a computer system for producing encoded video signals from captured video signals, according to a preferred embodiment of the present invention.

Referring now to FIG. 1, there is shown a computer system 100 for producing encoded video signals from captured video signals, according to a preferred embodiment of the present invention. This encoding is performed in accordance with the standards of a particular video format, such as H.261 or other suitable encoding standards, as will be appreciated. Computer system 100 may serve as one endpoint of a data conferencing, as will be appreciated. Analog-to-digital (A/D) converter 102 of computer system 100 receives analog video signals from a video source. The video source may be any suitable source of analog video signals such as a video camera or VCR for generating local analog video signals or a video cable or antenna for receiving analog video signals from a remote source. A/D converter 102 separates the analog video signal into constituent components and digitizes the analog components into digital video component data (e.g., in one embodiment, 24-bit RGB component data).

Capture processor 104 captures the digital 3-component video data received from converter 102. Capturing may include one or more of color conversion (e.g., RGB to YUV), scaling, and subsampling. Each captured video frame is represented by a set of three two-dimensional component planes, one for each component of the digital video data. In one embodiment, capture processor 104 captures video data in a subsampled YUV format, such as YUV9 (i.e., YUV 4:1:1). In the 3-component YUV color system, Y represents the luminance component and U and V represent chrominance components. One such YUV format is the YUV9 (or YUV4:1:1) format. In YUV9, each (4×4) block of image pixels is represented by a (4×4) block of 8-bit Y components, a single 8-bit U component, and a single 8-bit V component. As will be appreciated, each (4×4) block of pixels of the Y-component plane corresponds to a single pixel in the U-component plane and a single pixel in the V-component plane. As a result, each (4×4) pixel block is represented by (16×8+8 +8) or 144 bits, for an average of 9 bits per pixel. Thus, the name YUV9.

Capture processor 104 selectively stores the captured data to memory device 112 and/or mass storage device 120 via system bus 114. Those skilled in the art will understand that, for real-time encoding, the captured data are preferably stored to memory device 112, while for non-real-time encoding, the captured data are preferably stored to mass storage device 120. For non-real-time encoding, the captured data will subsequently be retrieved from mass storage device 120 and stored in memory device 112 for encode processing by host processor 116. As will be appreciated, in video conferencing systems (which typically use on-line, real-time encoding and decoding), each PC system may receive and decode encoded signals received from the PC systems of one or more remote participants to play the decoded video signals locally. In other situations, encoding may be done off-line.

During encoding, host processor 116 reads the captured bitmaps from memory device 112 via high-speed memory interface 110 and generates an encoded video bitstream that represents the captured video data. Depending upon the particular encoding scheme implemented, host processor 116 applies a sequence of compression steps to reduce the amount of data used to represent the information in the video images. Many video compression schemes divide images into blocks of pixels for compression purposes. The resulting encoded video bitstream is then stored to memory device 112 via memory interface 110. Host processor 116 may copy the encoded video bitstream to mass storage device 120 for future playback and/or transmit the encoded video bitstream to transmitter 118 for real-time transmission to a remote receiver (not shown in FIG. 1).

Figure 2:
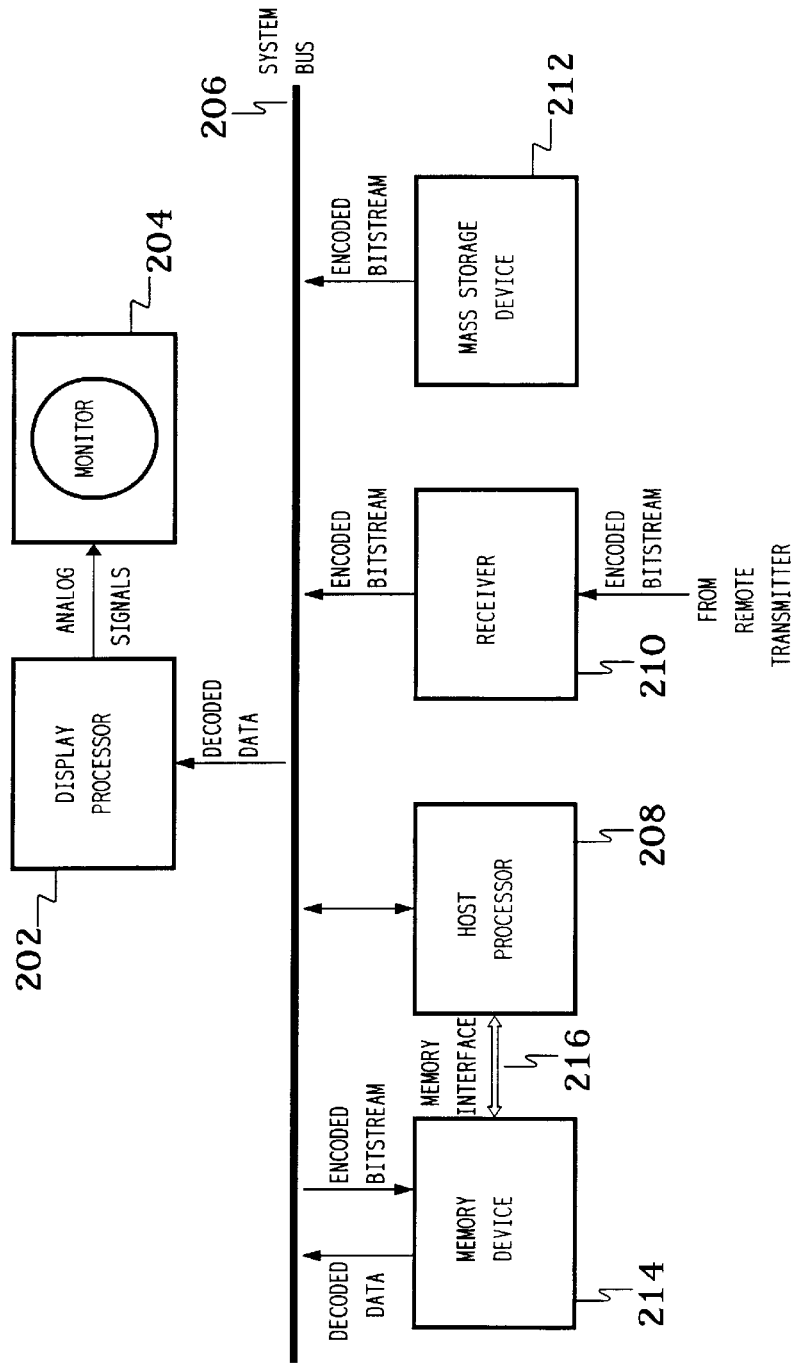
FIG. 2 is a computer-based decoding system for decoding the encoded video signals encoded by the encoding system of FIG. 1, according to a preferred embodiment of the present invention.

Referring now to FIG. 2, there is shown a computer system 200 for decoding the encoded video bitstream encoded by computer system 100 of FIG. 1, according to a preferred embodiment of the present invention. In computer system 200, the video bitstream to be decoded has been encoded in accordance with a particular video encoding format, and is decoded by decoding system 200 in accordance with this video encoding format. The encoded video bitstream is either read from mass storage device 212 of decoding system 200 or received by receiver 210 from a remote transmitter, such as transmitter 118 of FIG. 1. The encoded video bitstream is stored to memory device 214 via system bus 206. Decoding system 200 decodes the encoded bitstream.

Host processor 208 accesses the encoded video bitstream stored in memory device 214 via high-speed memory interface 216 and decodes the encoded video bitstream for display. Decoding the encoded video bitstream involves undoing the encoding implemented by encoding system 100 of FIG. 1. Host processor 208 stores the resulting decoded video data to memory device 214 via memory interface 216 from where the decoded video data are transmitted to display processor 202 via system bus 206. Alternatively, host processor 208 transmits the decoded video data directly to display processor 202 via system bus 206. Display processor 202 processes the decoded video data for display on monitor 204. The processing of display processor 202 includes digital-to-analog conversion of the decoded video data. Depending upon the particular embodiment, each of these processing steps may be implemented by either host processor 208 or display processor 202.

Referring again to FIG. 1, encoding system 100 is preferably a microprocessor-based PC system with a special purpose video-processing plug-in board. In particular, A/D converter 102 may be any suitable means for decoding and digitizing analog video signals. Capture processor 104 may be any suitable processor for capturing digital video component data as subsampled frames. In a preferred embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 is preferably a general-purpose microprocessor manufactured by Intel Corporation, such as an i486™, Pentium®, or Pentium® Pro processor. System bus 114 may be any suitable digital signal transfer device and is preferably a peripheral component interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital data and is preferably a computer hard drive. Transmitter 118 may be any suitable means for transmitting digital data to a remote receiver. Those skilled in the art will understand that the encoded video bitstream may be transmitted using any suitable means of transmission such as telephone line, RF antenna, local area network, or wide area network.

Referring again to FIG. 2, decoding system 200 is preferably a microprocessor-based PC system similar to the basic PC system of encoding system 100. In particular, host processor 208 may be any suitable means for decoding an encoded video bitstream and is preferably a general purpose microprocessor manufactured by Intel Corporation, such as an i486™, Pentium®, or Pentium® Pro processor. System bus 206 may be any suitable digital data transfer device and is preferably a PCI bus. Mass storage device 212 may be any suitable means for storing digital data and is preferably a CD-ROM device or a hard drive. Receiver 210 may be any suitable means for receiving the digital data transmitted by transmitter 118 of encoding system 100. Display processor 202 and monitor 204 may be any suitable devices for processing and displaying video images (including the conversion of digital video data to analog video signals) and are preferably parts of a PC-based display system having a PCI graphics board and a 24-bit RGB monitor.

In one embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video images. As will be appreciated, having both systems 100 and 200 implemented within a single PC can be advantageous for PCs that serve as endpoints of data conferences, which need to both encode and decode data such as video data. Those skilled in the art will understand that such a combined system may be used to display decoded video images in real-time to monitor the capture and encoding of video stream.

In alternative embodiments of present invention, the video encode processing of an encoding system and/or the video decode processing of a decoding system may be assisted by a pixel processor or other suitable component(s) to off-load processing from the host processor by performing computationally intensive operations.

Capture Engine and Playback Engine Architecture

There is provided herein a video subsystem architecture that may be implemented on a computer system having encoding and decoding systems such as encoding and decoding systems 100 and 200. The present video subsystem provides for capture, encoding, and transmission of local video data to remote endpoints on the network; for receipt, decoding, and displaying of encoded video data received from remote endpoints; and for the receipt of encoded data from an endpoint and retransmission of this encoded data to other endpoints.

Figure 3:
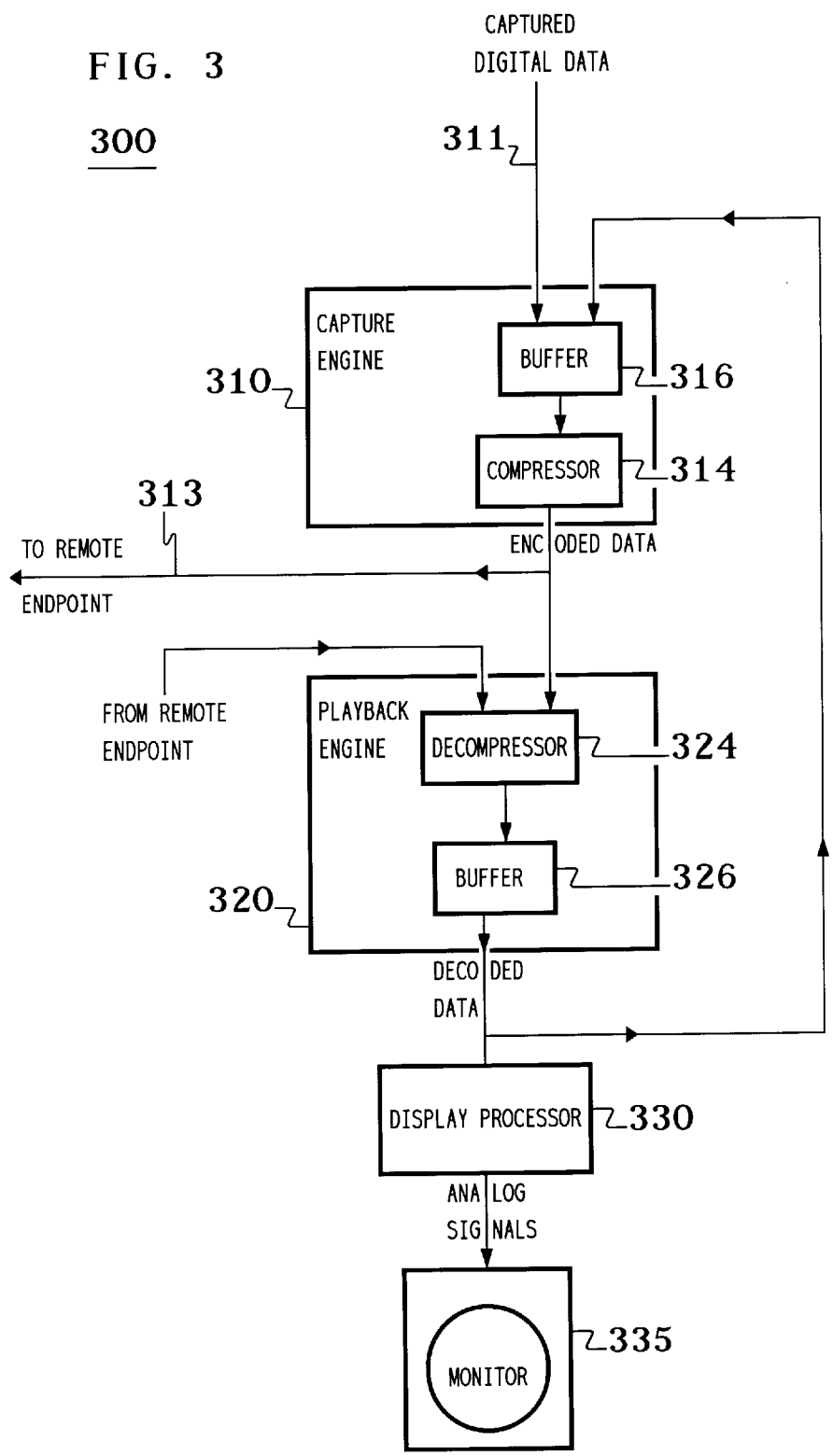
FIG. 3 shows the architecture of a video subsystem, in accordance with a preferred embodiment of the present invention.

Referring now to FIG. 3, there is shown the architecture of a video subsystem 300, in accordance with a preferred embodiment of the present invention. Video subsystem 300 comprises capture engine 310, playback engine 320, display processor 330 and monitor 335. As will be understood, the function of a video subsystem such as video subsystem 300 is, in general, to capture and compress local data; and receive, decompress and display compressed video data. The function of a capture engine such as capture engine 310 is, in general, to compress (i.e., encode) local video data captured in raw digital form. The function of a playback engine is, in general, to decompress and provide for display compressed video received from either a remote endpoint or local compressed data received from capture engine 310. Capture engine 310 thus comprises buffer 316 and compressor 314, and playback engine 320 comprises decompressor 324 and buffer 326.

In one mode of operation, capture engine 310 receives captured digital data on line 311. This data may be generated by a video source such as a local video camera and converted from analog to digital by an A/D converter such as A/D converter 102 of encoding system 100. The data thus received by capture engine 310 is digitized but not yet encoded; for example, the data may be RGB or YUV video data. Capture engine stores a set of data (e.g., a video frame) in buffer 316. Compressor 314 then encodes the data in buffer 316 by compressing it. The compressed data may be then transmitted to remote endpoints via line 313 and also transmitted to playback engine 320 so that the local video data may be displayed in a local video window on monitor 335. Thus, in this mode of operation, video subsystem 300 may act as a "front end" in a video conference, capturing and encoding local video and transmitting it to other endpoints of the conference.

Video subsystem 300 may also function as a "back end" in a video conference. In this mode of operation, encoded data such as compressed video frame data is received by playback engine 320 from a remote endpoint. The encoded data is decoded by decompressor 324 decompressing it. The decoded data is then stored in buffer 326. This decoded data may then may then be displayed on monitor 335 after being converted to analog signals by display processor 330, which may be similar to display processor 202 of decoding system 200, which is described hereinabove with reference to FIG. 2.

The above modes may be modified to allow video subsystem 300 to retransmit encoded data. Thus, encoded data may be received from one remote endpoint and retransmitted to another endpoint, as opposed to the above modes in which video subsystem 300 functions either as a back end or as a front end of the video conference. With the capability of functioning in this "retransmission mode," video subsystem 300 is not limited to being at the front or back end of a video conference, but rather may be positioned anywhere along the chain of an ongoing video conference.

Figure 4:
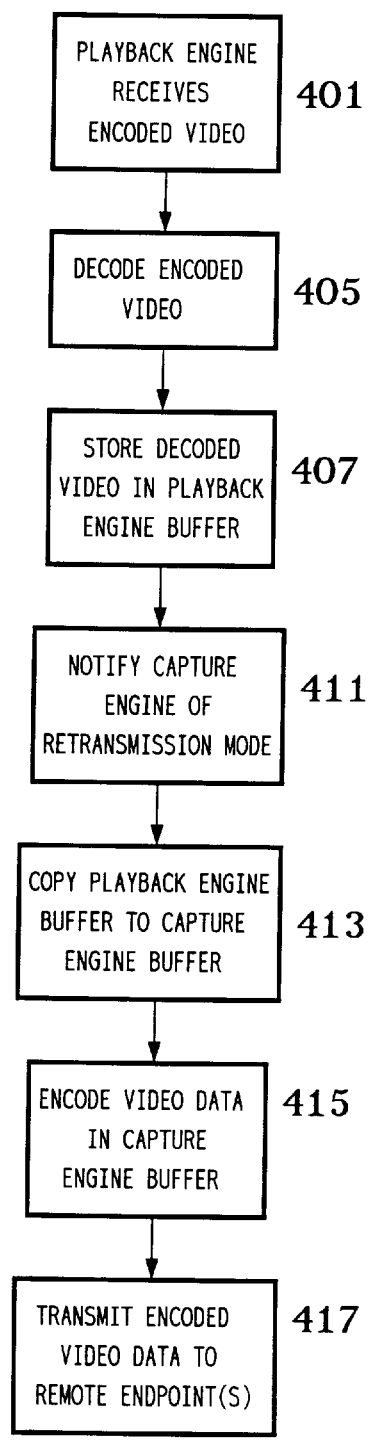
FIG. 4 is a flow chart of the method of operation of the video subsystem of FIG. 3 in retransmission mode, in accordance with a preferred embodiment of the present invention.

Referring now to FIG. 4, there is shown a flow chart 400 of the method of operation of video subsystem 300 in retransmission mode, in accordance with a preferred embodiment of the present invention. In retransmission mode, encoded data is received by playback engine 320 from a remote endpoint, as in the back end mode described above (step 401). The encoded data is decoded by decompressor 324 decompressing it (step 405). After the data is decoded, it is stored in buffer 326 (step 407).

Next, capture engine 310 is notified by playback engine 320 that retransmission mode should be initiated (step 411). Once notified, capture engine 310 copies the decoded data stored in buffer 326 into its own buffer 316 (step 413). Thus, instead of receiving unencoded data in buffer 316 from a source such as a video camera, buffer 316 receives unencoded data from playback engine 320. (As will be appreciated, the decoded data may also be displayed via display processor 330 on monitor 335.) Then, as in the front end mode described above, compressor 314 encodes the data in buffer 316 by compressing it (step 415). The compressed data may be then transmitted to remote endpoints via line 313 (step 417). This data may also be transmitted to playback engine 320, if desired, for display in a remote video window on monitor 335. In this way, video subsystem 300 may retransmit encoded data received from one endpoint to one or more other endpoints.

As will be appreciated, rather than capture engine 310 being notified by playback engine 320 that retransmission mode should be initiated (step 411, above), in an alternative embodiment, capture engine 310 may be so notified by an overarching video manager application or other suitable means.

As will also be understood, once capture engine 310 is notified that retransmission mode has been initiated, in alternative preferred embodiments, the decoded data produced by playback engine 320 may be made available for encoding by capture engine 310 by other suitable means. For example, instead of using two buffers 326 and 316, capture engine 310 may simply access the data directly in buffer 326 rather than first copying the data to buffer 316. Alternatively, a more direct communication link may be established between the output of decompressor 324 of playback engine 320 and compressor 314 of capture engine 310.

The present video subsystem architecture has been described in the context of a video data processing example. As will be understood by those skilled in the art, however, the present invention encompasses, in general, data processing not limited to video data.

As will be also be appreciated, architecture 300 may be implemented in hardware. As will be also be understood, the present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for processing data, the method comprising the steps of:

(a) receiving encoded video conference data from a remote computer system over a network with a playback engine of a computer system participating with the remote computer system in a video conference over the network;

(b) decoding the encoded data with a decoder of the playback engine and storing the decoded data in a playback engine buffer;

(c) notifying, with the playback engine, a capture engine of the computer system to encode the decoded data;

(d) copying the decoded data in the playback engine buffer into a capture engine buffer in response to the notification;

(e) encoding the decoded data in the capture engine buffer with an encoder of the capture engine; and (f) retransmitting, with the capture engine, the encoded data encoded by the encoder of the capture engine to a second remote computer system participating in the video conference over the network.

2. The method of claim 1, wherein the capture engine encodes locally-captured data if the capture engine is not notified by step (c).

3. The method of claim 1, wherein step (c) comprises the step of notifying the capture engine to enter a retransmission mode if the encoded data received by the playback engine is to be retransmitted by the computer system.

4. A computer system for processing data, comprising:

(a) capture engine means having an encoder means for encoding data provided thereto and a capture engine buffer;

(b) playback engine means for receiving encoded video conference data from a remote computer system over a network, wherein the computer system and the remote computer system participate in a video conference over the network, wherein the playback engine means comprises: a playback engine buffer, a decoder means for decoding the encoded data and for storing the decoded data in the playback engine buffer, and means for notifying the capture engine means to encode the decoded data stored in the playback engine buffer; and (c) means for copying the decoded data stored in the playback engine buffer into a capture engine buffer in response to the notification; wherein the capture engine further comprises means for retransmitting the encoded data encoded by the encoder means to a second remote computer system participating in the video conference over the network.

5. The computer system of claim 4, wherein the capture engine means encodes locally-captured data if the capture engine means is not notified.

6. The computer system of claim 4, wherein the means for notifying notifies the capture engine to enter a retransmission mode if the encoded data received by the playback engine means is to be retransmitted by the computer system.

7. A storage medium having stored thereon a plurality of instructions for processing data, wherein the plurality of instructions, when executed by a processor of a computer system, cause the processor to perform the steps of:

(a) receiving encoded video conference data from a remote computer system over a network with a playback engine of a computer system participating with the remote computer system in a video conference over the network;

(b) decoding the encoded data with a decoder of the playback engine and storing the decoded data in a playback engine buffer;

(c) notifying, with the playback engine, a capture engine of the computer system to encode the decoded data;

(d) copying the decoded data in the playback engine buffer into a capture engine buffer in response to the notification;

(e) encoding the decoded data in the capture engine buffer with an encoder of the capture engine; and (f) retransmitting, with the capture engine, the encoded data encoded by the encoder of the capture engine to a second remote computer system participating in the video conference over the network.

8. The storage medium of claim 7, wherein the capture engine encodes locally-captured data if the capture engine is not notified.

9. The storage medium of claim 7, wherein step (c) comprises the further step of notifying the capture engine to enter a retransmission mode if the encoded data received by the playback engine is to be retransmitted by the computer system.

10. A computer system for processing data, comprising:

a playback engine having a decoder and a playback engine buffer; and a capture engine having an encoder and a capture engine buffer; wherein:

the playback engine receives encoded video conference data from a remote computer system over a network;

the computer system and the remote computer system participate in a video conference over the network;

the decoder of the playback engine decodes the encoded data;

the playback engine stores the decoded data in the playback engine buffer;

the playback engine notifies the capture engine to encode the decoded data;

the capture engine copies the decoded data in the playback engine buffer into the capture engine buffer in response to the notification;

the encoder of the capture engine encodes the decoded data in the capture engine buffer; and the capture engine retransmits the encoded data encoded by the encoder to a second remote computer system participating in the video conference over the network.

11. The computer system of claim 10, wherein the capture engine encodes locally-captured data if the capture engine is not notified.

12. The computer system of claim 10, wherein the capture engine is notified to enter a retransmission mode if the encoded data received by the playback engine is to be retransmitted by the computer system.

* * * * *